United States Patent
Kroon

(10) Patent No.: US 10,451,906 B2
(45) Date of Patent: Oct. 22, 2019

(54) DISPLAY DEVICE AND DRIVING METHOD

(71) Applicant: KONINKLIJKE PHILIPS N.V., Eindhoven (NL)

(72) Inventor: Bart Kroon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 27 days.

(21) Appl. No.: 15/761,130

(22) PCT Filed: Sep. 15, 2016

(86) PCT No.: PCT/EP2016/071809
§ 371 (c)(1),
(2) Date: Mar. 19, 2018

(87) PCT Pub. No.: WO2017/050631
PCT Pub. Date: Mar. 30, 2017

(65) Prior Publication Data
US 2018/0259799 A1  Sep. 13, 2018

(30) Foreign Application Priority Data
Sep. 23, 2015 (EP) .................. 15186372

(51) Int. Cl.
*G02F 1/13* (2006.01)
*G02F 1/1335* (2006.01)
(Continued)

(52) U.S. Cl.
CPC ......... *G02F 1/1323* (2013.01); *G02B 6/0051* (2013.01); *G02B 6/0068* (2013.01);
(Continued)

(58) Field of Classification Search
CPC ............ G02F 1/1323; G02F 1/133512; G02F 1/133617; G02F 2203/62; G02F 2202/14;
(Continued)

(56) References Cited

U.S. PATENT DOCUMENTS 8,497,639 B2   7/2013  Tsang et al.
10,134,817 B2 * 11/2018 Xu .................. G09G 3/2096
(Continued)

FOREIGN PATENT DOCUMENTS

EP   0822441 A2   2/1988
GB   2405544 A    3/2005
(Continued)

OTHER PUBLICATIONS

Evans et al "The Generic Enhancement of Photochromic Dye Switching Speeds in Rigid Polymer Matrix" Nature Materials, vol. 4, pp. 249-253 (2005).
(Continued)

*Primary Examiner* — Donald L Raleigh

(57) ABSTRACT

A display device has a light blocking arrangement for selectively blocking light which has or would be emitted at large lateral angles. The display can be configured so that light reaching these elements is either allowed to reach the viewer or is blocked from reaching the viewer. This means that a public viewing mode can be chosen or a private viewing mode. The light blocking elements are controlled optically in order to simplify the construction and control.

20 Claims, 7 Drawing Sheets

(51) Int. Cl.
 *G02B 27/22* (2018.01)
 *F21V 8/00* (2006.01)
(52) U.S. Cl.
 CPC ... *G02B 27/2214* (2013.01); *G02F 1/133512* (2013.01); *G02F 1/133617* (2013.01); *G02F 2202/14* (2013.01); *G02F 2203/62* (2013.01)
(58) Field of Classification Search
 CPC . G02B 6/0068; G02B 6/0051; G02B 27/2214
 See application file for complete search history.

(56) References Cited

U.S. PATENT DOCUMENTS

| | | | |
|---|---|---|---|
| 2004/0100437 A1* | 5/2004 | Hunter | G02F 1/133617 345/102 |
| 2007/0047058 A1* | 3/2007 | Lim | G02B 27/2214 359/267 |
| 2007/0285775 A1* | 12/2007 | Lesage | G02F 1/0147 359/465 |
| 2009/0067156 A1 | 3/2009 | Bonnett et al. | |
| 2011/0116017 A1 | 5/2011 | Gere | |
| 2013/0050798 A1 | 2/2013 | Kim et al. | |
| 2015/0138457 A1* | 5/2015 | Kroon | G02B 27/2214 349/15 |

FOREIGN PATENT DOCUMENTS

| | | |
|---|---|---|
| GB | 2410116 A | 7/2005 |
| WO | 2005071449 A2 | 8/2005 |
| WO | 2007072289 A2 | 6/2007 |
| WO | 2007072330 A1 | 6/2007 |
| WO | 2008032248 A1 | 3/2008 |
| WO | 2008056553 A1 | 5/2008 |
| WO | 2009147588 A1 | 12/2009 |
| WO | 2011132992 A2 | 10/2011 |
| WO | 2012033583 A1 | 3/2012 |
| WO | 2013048847 A2 | 4/2013 |
| WO | 2013049088 A1 | 4/2013 |
| WO | 2013132123 A1 | 9/2013 |
| WO | 2013179190 A1 | 12/2013 |
| WO | 2013179191 A1 | 12/2013 |
| WO | 2014164257 A1 | 10/2014 |

OTHER PUBLICATIONS

Gass et al "Privacy LCD Technology for Cellular Phones" Sharp Laboratories of Europe, Nov. 8, 2006.

* cited by examiner (a)

(b)

(c)

(d)

DISPLAY DEVICE AND DRIVING METHOD

CROSS-REFERENCE TO PRIOR APPLICATIONS

This application is the U.S. National Phase application under 35 U.S.C. § 371 of International Application No. PCT/EP2016/071809, filed on Sep. 15, 2016, which claims the benefit of EP Patent Application No. EP 15186372.7, filed on Sep. 23, 2015. These applications are hereby incorporated by reference herein.

FIELD OF THE INVENTION

This invention relates to a display device which is able to provide a privacy mode and a public mode. It relates particularly but not exclusively to an autostereoscopic display device with a display panel having an array of display pixels for producing a display and an imaging arrangement for directing different views to different spatial positions.

BACKGROUND OF THE INVENTION

A first example of an imaging arrangement for use in an autostereoscopic display device of this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceives a stereo image in his/her eyes all the time.

The barrier arrangement is simple to produce but is not light efficient. A preferred alternative is therefore to use a lens arrangement as the imaging arrangement. An array of elongated lenses extending parallel to one another overlies the display pixel array and acts as a view forming means. These are known as "lenticular lenses". Outputs from the display pixels are projected through these lenticular lenses, which function to modify the directions of the outputs.

The lenticular elements are provided as a sheet of elements, each of which comprises an elongate semi-cylindrical lens element. The lenticular elements extend generally in the column direction of the display panel, with each lenticular element overlying a respective group of two or more adjacent columns of display sub-pixels.

The display panel for example comprises a two-dimensional liquid crystal display panel having a row and column array of display pixels (wherein a "pixel" typically comprises a set of "sub-pixels", and a "sub-pixel" is the smallest individually addressable, single-color, picture element). The sub-pixels together act as an image forming means to produce a display.

In an arrangement in which, for example, each lenticule is associated with two columns of display sub-pixels, the display sub-pixels in each column provide a vertical slice of a respective two dimensional sub-image. The lenticular sheet directs these two slices, and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display sub-pixels in the row direction. Corresponding columns of display sub-pixels in each group are arranged appropriately to provide a vertical slice from a respective two dimensional sub-image. As a user's head is moved from left to right, a series of successive, different, stereoscopic views are perceived creating, for example, a look-around impression.

Increasing the number of views improves the 3D impression but reduces the image resolution as perceived by the viewer, since all views are displayed at the same time by the native display. A compromise is typically found whereby a number of views (such as 9 or 15) are displayed in so-called viewing cones, and these viewing cones repeat across the field of view. The end result is a display with a large viewing angle, although viewers are not entirely free in choosing their location from which to view the 3D monitor or television: at the boundaries between viewing cones the 3D effect is absent and ghost images appear. This wide viewing angle is a problem in situations where the user of the display would prefer no eavesdropping on all or certain parts of the display content. One typical example is reading of mail and documents during commutes.

It has been proposed to provide a display with private and public viewing modes. This has also been proposed for 3D autostereoscopic displays, for example in WO 2013/179190.

This document discloses a lens-based autostereoscopic display device, in which a light blocking arrangement is provided between adjacent lens locations and the display is configurable in at least two different modes: a first privacy mode in which the light blocking arrangement blocks light which is directed between the lenses; and a second public mode in which the light blocking arrangement does not block the light which is directed between the lenses.

The switchable privacy mode is able to turn on and off cone repetition. With cone repetition, the display functions exactly like a regular lens-based autostereoscopic display, with a wide viewing angle similar to a regular 3D lenticular display. Without cone repetition (because of the blocking function between lenses), only the primary cone is visible and all other cones appear black. In the privacy mode, the output brightness to the desired viewing cone is not reduced, and the full display resolution is used.

The 3D lenticular display may also be switchable between a 2D and 3D mode, either because the lens is electro-optically switchable or because the lens is birefringent and the polarization of the display panel can be controlled. Especially when the light modulation by the light blocking arrangement is not based on polarization, the two functions can be independent and there can be four combined modes (2D private, 2D public, 3D private and 3D public).

The light blocking structures are however potentially difficult to manufacture, as they are vertical structures.

There is therefore a need for a light blocking arrangement for implementing public and private modes which can be implemented with low cost and low complexity.

SUMMARY OF THE INVENTION

According to the invention, there is provided a display and method as defined in the independent claims.

In one aspect, the invention provides a display device having a privacy mode and a public mode, comprising:

a display panel;

a backlight arrangement for illuminating the display panel; and a light blocking arrangement for selectively blocking light which is directed to a lateral output direction from the display panel;

wherein the display is configurable in the privacy mode in which the light blocking arrangement blocks the laterally directed light, and in the public mode in which the light blocking arrangement does not block the laterally directed light, wherein the light blocking arrangement comprises elements formed from a photochromic material, the blocking function of which is dependent on a light stimulus of a particular wavelength incident on the light blocking arrangement, wherein the backlight arrangement has:

a first, non-visible, light output which is the light stimulus for inducing switching of the light blocking elements towards an opaque state;

a second, visible, light output; and a third output for inducing switching of the light blocking elements towards a transparent state.

The light blocking elements may prevent a display output being seen from large lateral angles. For example the light blocking arrangement may block that light having a lateral emission angle centered around the normal direction of more than 60 degrees (i.e. >30 degrees each side of the normal), or mode than 40 degrees (i.e. >20 degrees each side of the normal), or more than 20 degrees (i.e. >10 degrees each side of the normal). A narrower range of output angles represents greater privacy. Thus, by "blocks laterally directed light" is meant that light in a direction with an angle laterally away from the normal which is greater than a threshold is blocked. This angle will depend on the height of the light blocking elements (i.e. the dimension in the normal direction) and their lateral spacing. They form light tubes.

The light blocking function is controlled by an optical input. This means that complex arrangements of control electrodes are not needed, and the structure and manufacture of the light blocking elements can be simplified. The switching is actively controlled using the backlight.

The switching may be based on input received from the user, for example via a switch (either physical such as a laptop key, or in software) to switch between the two states. A privacy mode may be allocated to applications that run on the device, such that when at least one application that has this privacy mode is run, the viewing angle is limited to a single cone.

The device has a backlight arrangement for illuminating the display panel. This may be used to generate the light output when the display pixels themselves are not emissive, for example for a liquid crystal display. The backlight is also be used to implement the optical control of the light blocking elements by incorporating suitable light emitting elements.

For this purpose, the backlight arrangement comprises a non-visible light output for inducing switching of the light blocking elements towards an opaque state and a visible light output. The backlight arrangement may have separate overlaid units, or they may be integrated together as a single structure over a common substrate.

By way of example, the backlight arrangement may comprise a single waveguide with scattering dots to provide out-coupling of light from the waveguide, and multiple LEDs or LED packages providing light into the waveguide. The scattering dots should then be sufficiently wavelength independent to provide out-coupling of all required light.

A UV filter may be provided at the display panel output. This is used to prevent exposure of the user of the device to the UV light generated by the backlight, and also to prevent ambient UV light reaching the light blocking elements and thereby inducing undesired switching.

The third output, for inducing switching of the light blocking elements towards a transparent state, is used to increase the speed of response of the light blocking elements, in particular for switching to the transparent state. The third output is preferably a non-visible light output, for example an IR light output. This is used to induce heating, which can speed up the recovery of the photochromic material.

The backlight arrangement may then comprise a single waveguide with scattering elements to provide out-coupling of light from the waveguide, and UV, IR and visible light LEDs providing light into the waveguide. However, there may instead be three stacked separate backlight units, or two or more may be integrated into a common structure.

An IR filter may then be provided at the display panel output to prevent IR radiation reaching the user.

The light blocking arrangement for example comprises a photochromic material comprising a mixture of a solvent, resin or polymer with a photochromic dye.

The display device may comprise:

an array of lenses arranged in front of the display panel, wherein the light blocking arrangement is for selectively blocking light which is directed between the lenses, wherein the light blocking arrangement comprises elements provided between adjacent lens locations, wherein in the privacy mode the light blocking arrangement blocks the light which is directed between the lenses, and in the public mode the light blocking arrangement does not block the light which is directed between the lenses.

By "directed between the lenses" is meant light that has a direction which passes from one lens to an adjacent lens before reaching the lens output.

In this aspect the invention provides a lens-based autostereoscopic display device, in which a switchable privacy mode is able to turn on and off cone repetition. With cone repetition, the display functions exactly like a regular lens-based autostereoscopic display. Without cone repetition (because of the blocking function between lenses), the viewing angle is limited to one cone. The opening angle of the single viewing cone is a lens design choice based on the relation between the lens pitch and sheet thickness.

Examples in accordance with another aspect of the invention provide a method of operating a display device having a privacy mode and a public mode, wherein the display device comprises a display panel, a backlight arrangement for illuminating the display panel and a light blocking arrangement for selectively blocking the light which is directed to a lateral output direction from the display panel, wherein the light blocking arrangement is formed from a photochromic material, the blocking function of which is dependent on a light stimulus of a particular wavelength incident on the light blocking arrangement, wherein the method comprises configuring the display in one of the privacy mode and the public mode in dependence of the spectrum of light incident on the light blocking arrangement, wherein the method comprises:

using the backlight arrangement to provide a first, non-visible, light output which is the light stimulus for inducing switching of the light blocking elements towards an opaque state to implement the privacy mode, in which the light blocking arrangement blocks the laterally directed light;

using the backlight arrangement to provide a second visible light output; and removing the light stimulus from the light blocking arrangement and using the backlight arrangement to provide a third output for inducing switching of the light blocking elements towards a transparent state to implement the public mode in which the light blocking arrangement does not block the laterally directed light.

The method may be for operating an autostereoscopic display device, which comprises an array of lenses arranged in front of the display panel, and the light blocking arrangement is for selectively blocking the light which is directed between the lenses, wherein the light blocking arrangement comprises elements provided between adjacent lens locations, wherein in the privacy mode the light blocking arrangement blocks the light which is directed between the lenses; and in the public mode the light blocking arrangement does not block the light which is directed between the lenses.

BRIEF DESCRIPTION OF THE DRAWINGS

An embodiment of the invention will now be described, purely by way of example, with reference to the accompanying drawings, in which.

DETAILED DESCRIPTION OF THE EMBODIMENTS

The invention provides a display device that has a light blocking arrangement for selectively blocking light which has or would be emitted at large lateral angles. The display can be configured so that light reaching these elements is either allowed to reach the viewer or is blocked from reaching the viewer. This means that a public viewing mode can be chosen or a private viewing mode. The light blocking elements are controlled optically in order to simplify the construction and control.

The invention will be described with reference to an autostereoscopic display device, but it can be used generally to provide a private and a public viewing mode.

Figure 1:
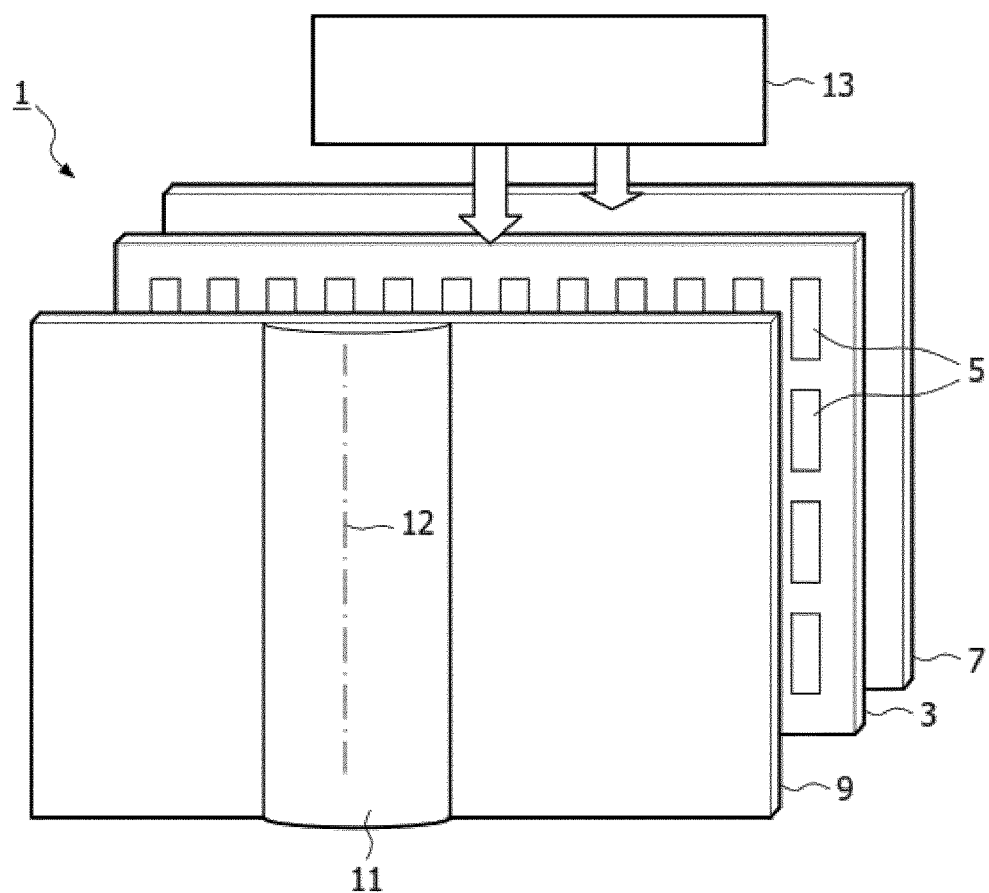
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display sub-pixels 5 arranged in rows and columns. For the sake of clarity, only a small number of display sub-pixels 5 are shown in the Figure. In practice, the display panel 3 might comprise about one thousand rows and several thousand columns of display sub-pixels 5. In a black and white display panel a sub-pixel in fact constitutes a full pixel. In a color display a sub-pixel is one color component of a full color pixel. The full color pixel, according to general terminology comprises all sub-pixels necessary for creating all colors of a smallest image part displayed.

A full color pixel may have red (R) green (G) and blue (B) sub-pixels possibly augmented with a white sub-pixel or with one or more other elementary colored sub-pixels. For example, an RGB (red, green, blue) sub-pixel array is well known, although other sub-pixel configurations are known such as RGBW (red, green, blue, white) or RGBY (red, green, blue, yellow).

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material therebetween. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display sub-pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display sub-pixel array. Light from the light source 7 is directed through the display panel 3, with the individual display sub-pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The device has a controller 13 which controls the backlight and the display panel.

The autostereoscopic display device 1 shown in FIG. 1 is capable of providing several different perspective views in different directions. In particular, each lenticular element 11 overlies a small group of display sub-pixels 5 in each row. The lenticular element 11 projects each display sub-pixel 5 of a group in a different direction, so as to form the several different views. As the user's head moves from left to right, his/her eyes will receive different ones of the several views, in turn.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the imaging arrangement of the device.

Figure 2:
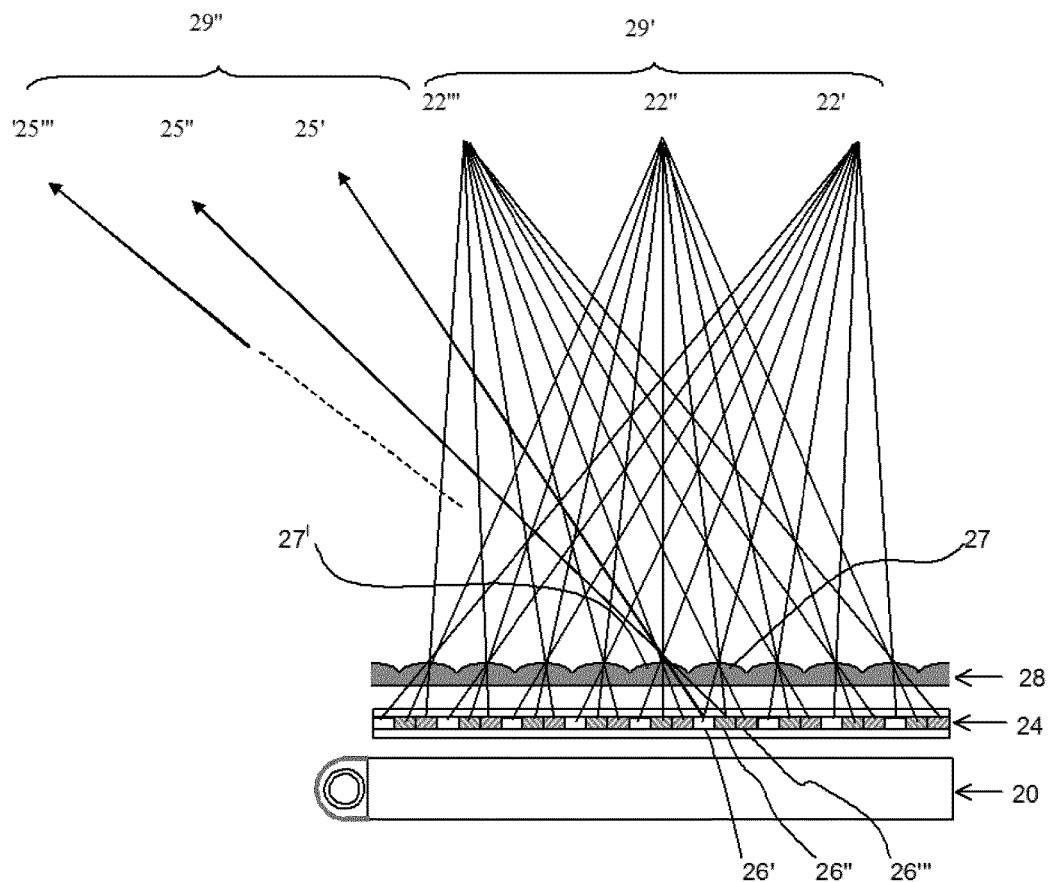
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28 of lenses 27. FIG. 2 shows how the lenticular arrangement 28 directs different pixel outputs to three different spatial locations.

When applied to an autostereoscopic display, the invention relates to view repetition in such displays, which is explained below.

Figure 3:
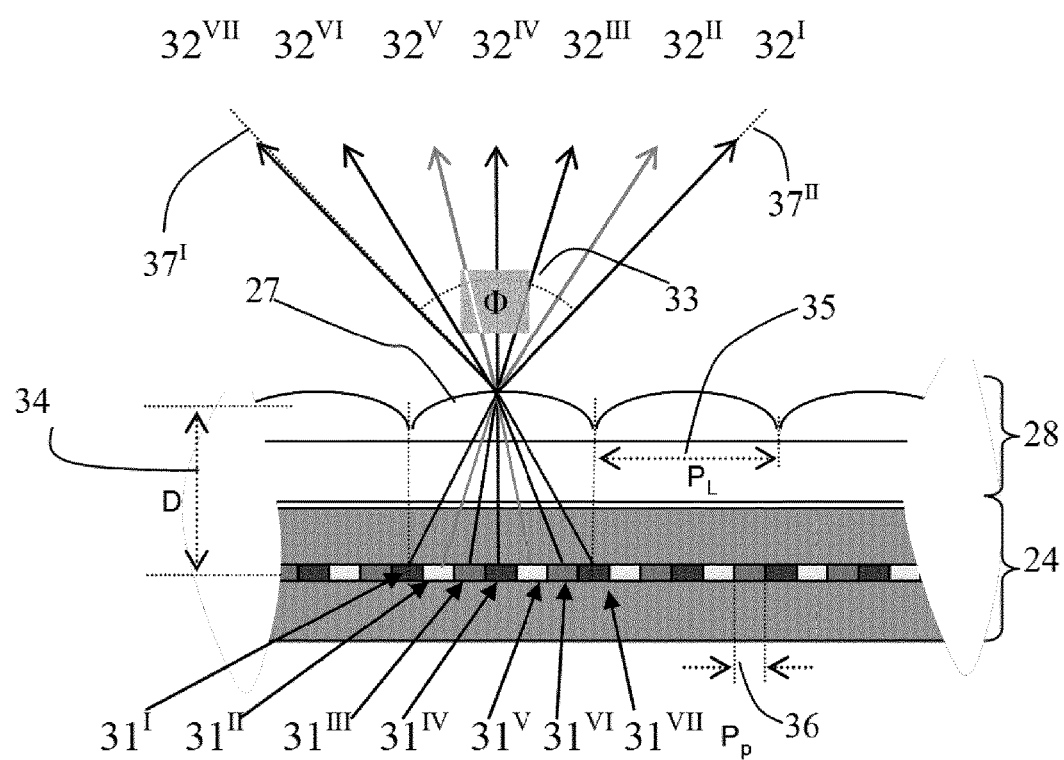
FIG. 3 shows a cross-section of the layout of a multi-view auto-stereoscopic display.

FIG. 3 shows a cross-section of the layout of a multi-view auto-stereoscopic display. Each sub-pixel $31^I$ to $31^{VII}$ underneath a certain lenticular lens 27 will contribute to a specific view $32^I$ to $32^{VII}$. All sub-pixels underneath this lens will together contribute to a cone of views. The width of this cone (between lines 37' and 37") is determined by the combination of several parameters: it depends on the distance 34 (D) from the pixel plane to the plane of the lenticular lenses. It also depends on the lens pitch 35 ($P_L$).

Figure 4:
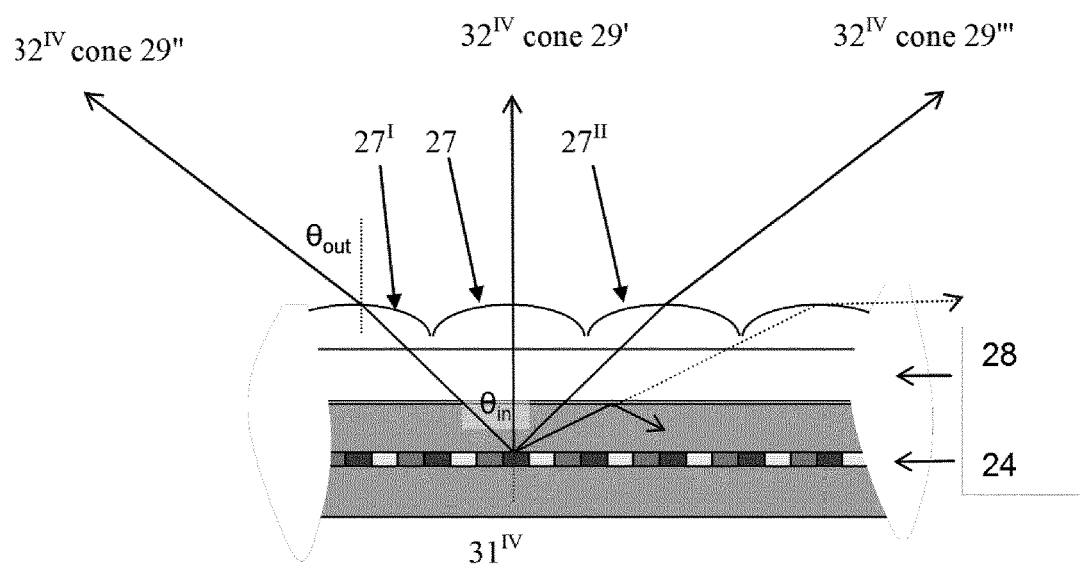
FIG. 4 is a close-up of FIG. 3.

FIG. 4 is a close-up of FIG. 3, and shows that the light emitted (or modulated) by a pixel of the display 24 is collected by the lenticular lens 27 closest to the pixel but also by neighboring lenses 27' and 27" of the lenticular arrangement 28. This is the origin of the occurrence of repeated cones of views. Pixel $31^{IV}$ for example contributes to viewing cones 29', 29" and 29'" as shown.

Figure 5:
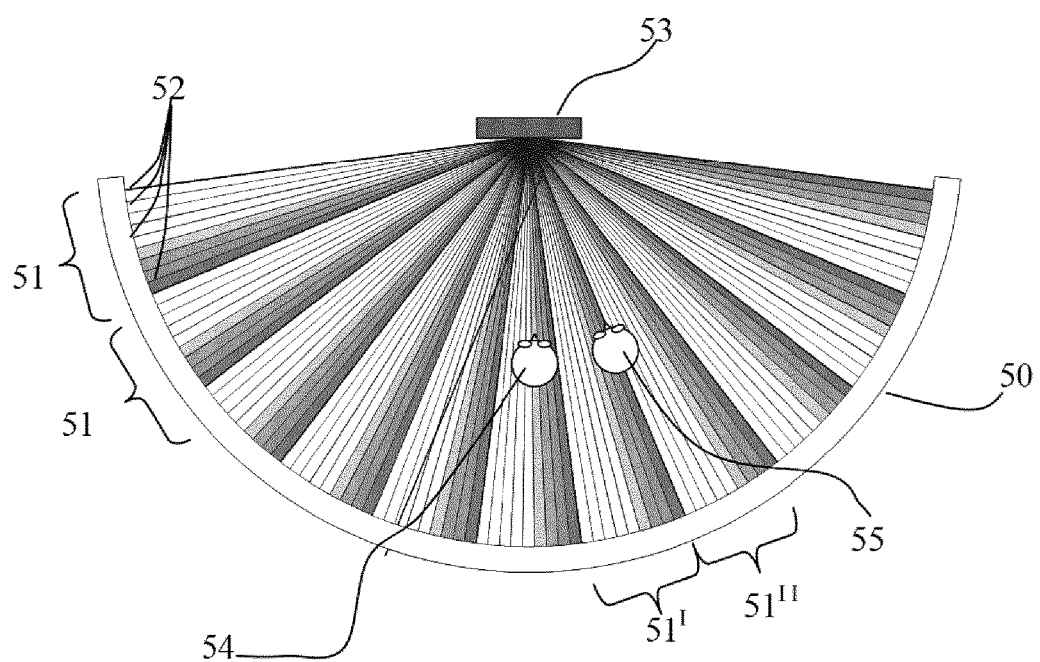
FIG. 5 shows a 9-view system in which the views produced in each of the sets of cones are equal.

The corresponding views produced in each of the cones are equal. This effect is schematically shown in FIG. 5 for a 9-view system (i.e. 9 views in each cone).

For an acceptable compromise between 3D effect and resolution penalty, the total number of views is limited to typically 9 or 15. These views have an angular width of typically 1 to 2 degrees. The views and the cones have the property that they are periodic.

Figure 6:
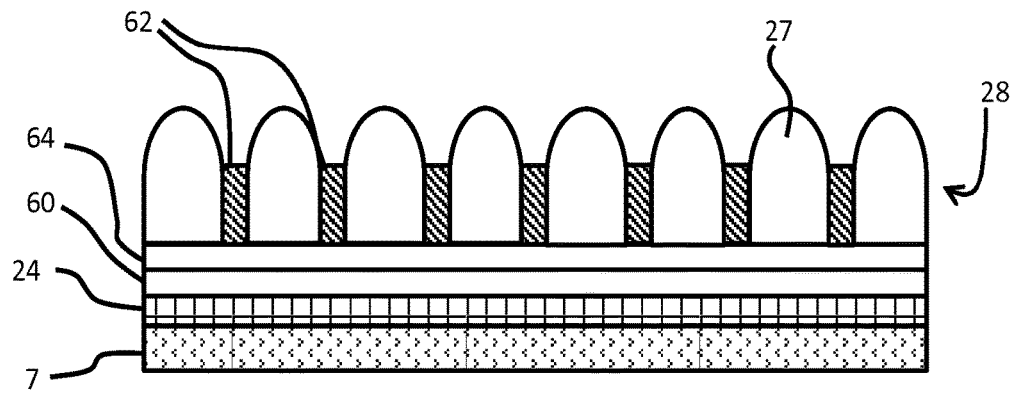
FIG. 6 shows an example of display device as disclosed in WO2013/179190.

FIG. 6 shows one example arrangement of WO 2013/179190 in which light blocking elements 62 are provided between the lenses. The arrangement as a whole (not necessarily the parts between the lenses) can be switched to a light transmitting or blocking mode. In this way, light from a pixel that would leave the display from a neighboring lens can be blocked while the primary viewing cone is unaltered. The system can be implemented as optical elements between the lenticules and additional layers which provide the control of the light entering/leaving the lenticular lenses so that the light blocking function is enabled or disabled.

Examples of possible light blocking arrangement disclosed in WO2013/179191 are:

(i) The light blocking structure is a polarizer, and the optical path includes at least one retarder.

(ii) The light blocking structure is a retarder and the optical path includes a polarizer.

(iii) The light blocking structure is an electrophoretic cell.

FIG. 6 is based on the use of a polarizer as the light blocking element. A first polarizer 60 is provided between the display panel 24 and the lenticular array 28. An arrangement of second polarizers 62 is provided between the lens elements. An optical retarder 64 is provided between the polarizers 60, 62.

The lenticular sheet can be manufactured by embossing the lenticular sheet and filling it with material that, when dry, has a polarizing function. An alternative is to produce lenticular and polarizing strips separately and then glue them together to form a lenticular sheet. That sheet can then be placed on top of the other display layers.

The retarder 64 can for example be a single liquid crystal cell covered on both sides with a single transparent (for example ITO) electrode, such that the retarder as a whole can be switched between polarity states. Alternatively the retarder 64 can be patterned such that an LC cell covers a single sub-pixel, pixel or set of pixels. In that case cells can be switched independently. This allows for content, task or application privacy modes such that sensitive information on the display (for example mail) is only visible in a small viewing cone, while insensitive information is not.

The structures disclosed require electrically controlled layers or stripes with their associated electrode arrangements, and this increased the complexity of the design of the lenticular structure.

An alternative has been proposed in WO2013/048847 in which barriers are formed from electrochromic material, so that the barrier transmittance is electrically controllable by application of an electric field. This again requires a control electrode arrangement as part of the lenticular structure.

This invention makes use of optically controlled light blocking elements. The design thus makes use of photochromic materials.

Figure 7:
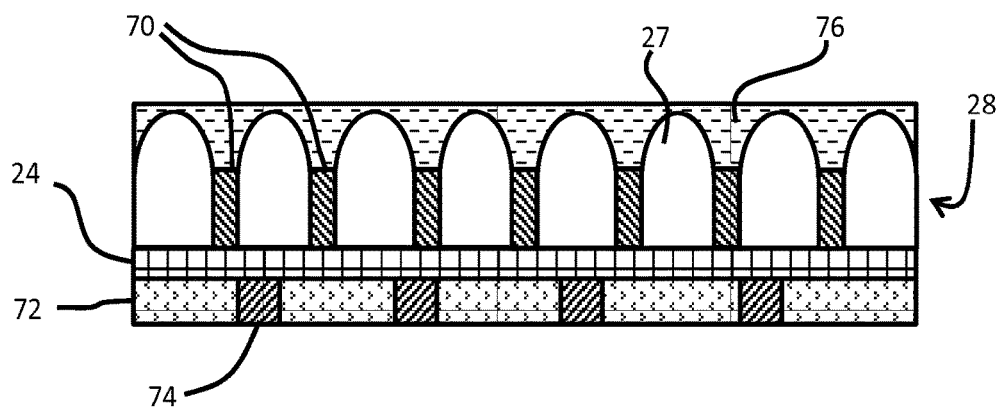
FIG. 7 shows a first example of display device of the invention.

FIG. 7 shows an example.

The light blocking elements 70 are formed from a photochromic material. They have an optical absorptance which is dependent on a light stimulus.

A photochromic material is selected that can be switched in a relatively short time, e.g. seconds or tens of seconds, but preferably less than a minute, or less than 30 seconds. Preferably, the switching time is less than 10 seconds.

A photochromic material is generally a mixture of a solvent, resin or polymer with a photochromic dye. There are many photochromic molecules that may be used. For example, photochromic molecules can belong to various classes: triarylmethanes, stilbenes, azastilbenes, nitrones, fulgides, spiropyrans, naphthopyrans, spiro-oxazines, quinones and others.

One well known use of photochromic materials is in light reacting sunglasses. A typical photochromic material used in light reacting sunglasses is based on a solution with silver chloride or silver halide. The molecules are transparent to visible light in the absence of UV light, which is normal for artificial lighting. When exposed to UV rays, as in direct sunlight, the molecules undergo a chemical process that causes a shape change. The new molecular structure absorbs portions of the visible light, causing the lenses to darken. The number of molecules that change shape varies with the intensity of the UV light.

A subsequent absence of UV radiation causes the molecules to return to their original shape, resulting in the loss of their light absorbing properties.

The switching speed of photochromic dyes is typically higher in solution than when trapped in a polymerized matrix. However, there are known solutions which add a chemical component to a photochromic dye to improve the switching speed for a polymerized matrix. An example is disclosed in R. A. Evans et al., The generic enhancement of photochromic dye switching speeds in a rigid polymer matrix, Nature Materials, volume 4, pp. 249-253, 2005.

Another approach for increasing the switching speed is disclosed in WO 2013/132123 which discloses a photochromic-material based on oil core capsules.

The photochromic dye may have any desired color. Silver chloride or halide is silver/grey, but other materials may be selected to provide other colors if desired.

In order to provide the light stimulus, the backlight 72 is designed to provide a switchable UV output. For example, the backlight 72 may comprise an LED backlight comprising an array of LEDs. In one example, the backlight arrangement comprises a single waveguide with scattering dots to provide out-coupling of light from the waveguide, and multiple LEDs or LED packages including both UV and visible light LEDs providing light into the waveguide. This provides an edge-lit waveguide backlight design with multiple light wavelengths provided to the waveguide. The scattering dots (or other light out-coupling structures such as raised or indented profiles) are selected to be sufficiently wavelength independent to provide out-coupling of all required light.

The use of a photochromic material means that electrodes are not needed to switch between the public and private modes.

When the UV LEDs are turned off, the display (gradually) returns to public mode. FIG. 7 also shows a UV-filter 76 in front of the blocking elements 70 (i.e. on the display output side) to prevent the display from switching to the private mode in the presence of sunlight, and also to prevent the user from prolonged UV radiance.

A high intensity UV light output may be used when switching to the private mode to enable fast switching, and a lower intensity UV light may be used to maintain the private mode. Thus, the second backlight unit may have a variable output intensity, with the intensity controlled during transition between the two modes of operation.

Switching to the public mode is made more rapid by implementing heating, for example using Infrared (IR) LEDs, because the return to a transparent state when the UV LEDs are turned off makes use of a heat-based process. The IR LEDs function as a heat source, and they are thermally coupled to the light blocking elements to transform the generated IR light into heat.

Some alternatives to the single waveguide approach outlined above will now be presented.

A first alternative is to provide only UV LEDs, and incorporate a patterned layer of phosphors, or a patterned layer of a mixture of quantum dots, in order to obtain narrow red, green and blue peaks in the visible spectrum, and also an IR peak. In this way, it is possible to generate visible light and also IR radiation from UV light sources.

Another alternative is to provide a filter layer between the backlight unit and the photochromic elements 70 that absorbs or reflects a narrow band of UV frequency. This could be implemented as a Bragg reflector, and this is used to generate heat along the entire backlight and thus at each of the light blocking elements. Another UV band may then be transmitted through the filter for implementing the switching function. In this case there could be two or three different sets of UV LEDs for all functions. It is again also possible to generate a second UV band from a first UV band using a quantum dot layer or phosphor layer.

In principle, there are many other general backlight configurations which may be used to provide a UV (or generally a non-visible) light output and a visible light output. Examples include:

a visible light edge-lit waveguide with a directly illuminating UV LED array on top which is substantially transparent (to visible light);

a visible light edge-lit waveguide with an edge-lit UV waveguide on top which is substantially transparent (to visible light);

a UV edge-lit waveguide with a visible edge-lit waveguide on top which is substantially transparent (to UV);

a UV edge-lit waveguide with a directly illuminating visible LED array on top which is substantially transparent (to UV);

a directly illuminating LED array with a substantially transparent UV directly illuminating LED array on top;

a directly illuminating visible LED array with an edge-lit UV backlight on top; and interspersed direct light UV and visible LEDs on a single support panel.

Diffusers may be used to spread the UV and visible light output (and also IR if used).

Different intensities for the UV light and the visible light may be selected. A larger UV intensity, for example implemented by UV LEDs occupying a larger proportion of a shared backlight area, will increase switching speed but might reduce display uniformity. Different light sources (UV, RGB, IR) may be provided on different sides of an edge lit backlight.

IR LEDs may be integrated into the backlight in the same way (and as well as) as UV LEDs in any of the manners as explained above. In this case, the filter 76 comprises a band-pass filter which blocks both UV and IR light. The system then makes use of two wavelengths, and the chemical processes in the photochromic layer react to those wavelengths to switch transparency and thereby between private and public modes.

The light blocking elements may be positioned at any position between the backlight and the viewer. In the example above, they are between the lens elements and therefore over the display panel. However, they may be between the backlight and the display panel. This arrangement may reduce moiré effects.

The example above is actively switchable between the private and public modes.

A UV-filter between the viewer and the light blocking elements may be used to prevent the sunlight from switching the display. The display thus can be in public or private mode in any ambient light situation.

The lens array according to FIG. 7 can be made by molding and curing a polymer to form the lenses. The photochromic material (polymer and dye) is then provided between the lenses and the photochromic polymer is also cured.

The example above shows the curved faces of the lenticulars of the lenticular array 28 facing away from the display panel 24. An alternative design, which has better performance over wide viewing angles, is described in detail in WO 2009/147588. The application of this type of design is shown in FIG. 8.

A glue 80 (typically a polymer) has a refractive index that is different from that of the lenticular lens array 28. A glass or polycarbonate slab 82 has a refractive index similar to the glue 80 and is used to create enough distance for the lenticular lens to focus on the display panel 24. The curved face of the lenticulars of the lenticular array 28 then faces toward the display panel 24.

The slab 82 incorporates the light blocking elements 70.

Figure 8:
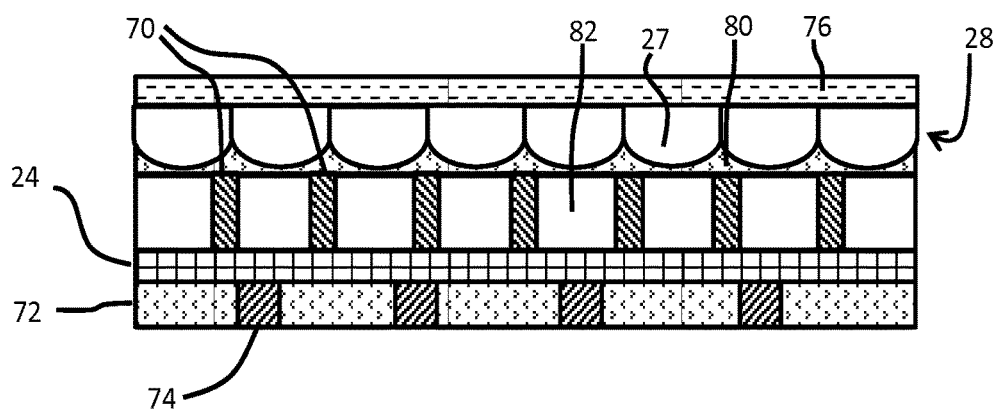
FIG. 8 shows a second example of display device of the invention.

FIG. 8 is more straightforward to manufacture because the light blocking elements are in the spacer and the lenticular lens is on top. Thus, they can be made separately. The photochromic material could be a solvent and dye to enable a fast response, in which case the two substrates have to be sealed. Alternatively, a polymerized matrix design may be used to avoid the need for sealing.

It can be seen from the examples above that the light blocking elements are integrated into the structure of the display panel, so they are between the display output surface (for example the lenticular lenses) and the display backlight, i.e. beneath the display output surface and above the backlight output surface. They may be:

between the individual lenses of a lenticular array (FIG. 7);

between the lenticular array layer and the display panel (FIG. 8); or between the backlight and the display panel.

As explained above, the backlight preferably makes use of LEDs such as white LEDs. This give good energy efficiency and they can be turned on and off quickly and thereby allow frame-based local dimming in order to improve the black level and power efficiency. Another step is to use RGB LEDs instead of white LEDs with the benefit that the color gamut can be increased. The LEDs can be placed behind the display panel or on the sides of a patterned waveguide to produce a side-lit display.

However, a cold cathode fluorescent lamp ("CCFL") backlight may instead by used, which typically comprises a row of CCFL lamps placed in a cavity lined with a white and diffuse (Lambertian) back. The light from the CCFL lamps either directly or via the back lining passes through a diffuser to hide the lamps and ensure sufficiently uniform screen intensity.

Organic light emitting diodes (OLED), organic light emitting transistors (OLET) and quantum dot LEDs (QLED) may also be used to create backlights as the techniques allow to create a uniformly emitting surface. This removes the need for diffusers and waveguides and thus can reduce the number of components and make the display even thinner. However, to use the full potential of these techniques, the pixels themselves could be emitters to improve the efficiency.

A backlight can then be dispensed with for the generation of the image to be displayed if a direct emitting display technology is used. For the controllable implementation above, only a UV lighting arrangement is then needed to implement control of the light blocking elements.

The invention can be applied to all of these types of display.

The examples above show non-switchable autostereoscopic displays.

By making the lens of a multi-view display switchable, it becomes possible to have a high 2D resolution mode in combination with a 3D mode. Other uses of switchable lenses are to increase the number of views time-sequentially (WO 2007/072330) and to allow multiple 3D modes (WO 2007/072289). Known methods to produce a 2D/3D switchable display replace the lenticular lens by:

(i) A lens shaped cavity filled with liquid crystal material of which the lens function is turned on/off by electrodes that control the orientation of LC molecules or is turned on/off by changing the polarization of the light (through a switchable retarder).

(ii) A box shaped cavity filled with liquid crystal where electrodes control the orientation of LC molecules to create a gradient-index lens (see for instance WO 2007/072330).

(iii) An electro wetting lens of droplets of which the shape is controlled by an electric field.

(iv) A lens-shaped cavity filled with transparent electrophoretic particles in a fluid of different refractive index (WO 2008/032248).

This invention can be applied to switchable autostereoscopic displays, for example of the types outlined above.

The examples above make use UV illumination to control the switching of the full display. The UV light source may be controllable locally as a pixelated light source, to enable a locally set switchable privacy mode. In this case, the device can operate such that the privacy mode is set locally in a way that is clear and convenient to the user.

The examples above show the use of the invention in an autostereoscopic display. The invention may however be used for a 2D display, to provide private and public viewing modes.

When applied to an autostereoscopic display, the light blocking elements may be placed at different positions in the stack (e.g. in front or behind the lens array or between the backlight and the display panel). The function of the light blocking elements are essentially to provide collimation of light. To preserve the collimation, there should be no strongly diffusing elements in front of the privacy filter because the benefit would be lost.

As explained above, the photochromic arrangement does not do not interfere with the 3D function of a 3D lenticular display, especially when the light blocking elements are optimized to pass the primary cone, and reduce secondary viewing cones.

An important benefit that is specific to 3D lenticular displays is that the fall off in the primary cone of the intensity caused by the light blocking elements (at least in private mode) can be partially compensated for by setting a correcting intensity profile along the views.

Figure 9:
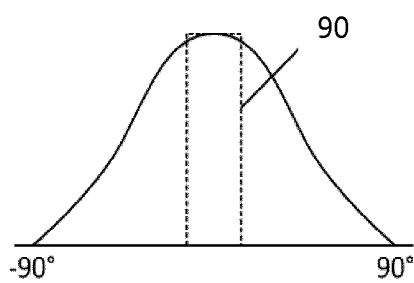
FIG. 9 shows how the intensity of views within a viewing cone may be adapted to improve the cutoff in the private viewing mode.
Figure 9:
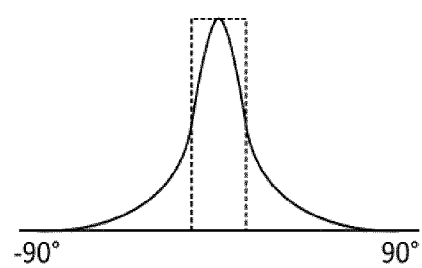
Figure 9:
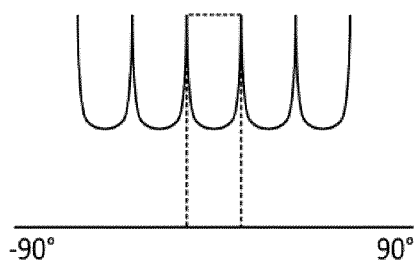
Figure 9:
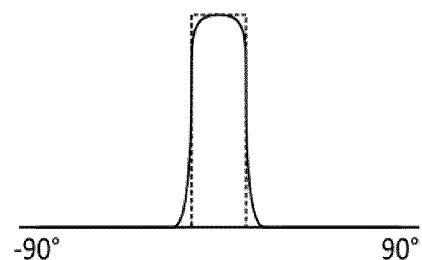

This approach is shown in FIG. 9. FIG. 9(a) shows the intensity (y-axis) as function of angle (x-axis) in the public mode. The primary cone 90 has a width of around 15 degrees each side of the normal. FIG. 9(b) shows the intensity (y-axis) as function of angle (x-axis) in the private mode without any compensation.

FIG. 9(c) shows the intensity (y-axis) as function of angle (x-axis) to represent the compensation function applied in the private mode. The resulting intensity (y-axis) as function of angle (x-axis) in the private mode without this compensation in shown in FIG. 9(d).

The center views within the primary cone 90 (and indeed within each cone) are adapted to have a lower intensity than the outer views. Due to cone repetition, the falloff to the secondary cone will be sharper as shown in FIG. 9(d).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A display device having a privacy mode and a public mode, comprising:
    a display panel;
    a backlight arrangement, wherein the backlight arrangement is arranged to illuminate the display panel; and
    a light blocking arrangement,
        wherein the light blocking arrangement is arranged to selectively block light,
        wherein the light is directed in a lateral output direction from the display panel,
        wherein the display blocks the laterally directed light using the light blocking arrangement in the privacy mode,
        wherein the display does not block the laterally directed light in the public mode, wherein the light blocking arrangement comprises elements formed from a photochromic material,
wherein the blocking function of the photochromic material is dependent on a light stimulus of a particular wavelength incident on the light blocking arrangement,
wherein the backlight arrangement has a first, non-visible, light output which is the light stimulus for inducing switching of the light blocking elements to an opaque state,
wherein the backlight arrangement has a second, visible, light output,
wherein the backlight arrangement has a third output for inducing switching of the light blocking elements to a transparent state
wherein the first, non-visible output is a UV light output,
wherein the third output is an IR light output.

2. The display device as claimed in claim 1, further comprising a UV filter at the display panel output.

3. The display device as claimed in claim 1, further comprising an IR filter at the display panel output.

4. The display device as claimed in claim 1,
wherein the backlight arrangement comprises a single waveguide,
wherein the single waveguide comprises scattering elements,
wherein the scattering elements are arranged to provide out-coupling of a first light from the waveguide,
wherein the backlight arrangement comprises UV, visible and IR light LEDs, UV, visible and IR light LEDS provide a second light into the waveguide.

5. The display device as claimed in claim 1, wherein the light blocking arrangement comprises a photochromic material, the photochromic material comprising a mixture of a solvent, resin or polymer with a photochromic dye.

6. The display device as claimed in claim 1, further comprising:
an array of lenses, wherein the array of lenses is arranged in front of the display panel,
wherein the light blocking arrangement selectively blocks light which is directed between the lenses,
wherein the light blocking arrangement comprises elements disposed between adjacent lens locations,
wherein the light blocking arrangement blocks the light which is directed between the lenses in the privacy mode,
wherein the light blocking arrangement does not block the light which is directed between the lenses in the public mode.

7. The display device as claimed in claim 2, wherein the third output is an IR light output.

8. The display device as claimed in claim 7, further comprising an IR filter at the display panel output.

9. The display device as claimed in 7,
wherein the backlight arrangement comprises a single waveguide,
wherein the single waveguide comprises scattering elements,
wherein the scattering elements are arranged to provide out-coupling of a first light from the waveguide,
wherein the backlight arrangement comprises UV, visible and IR light LEDs, UV, visible and IR light LEDS provide a second light into the waveguide.

10. The display device as claimed in claim 1, further comprising an IR filter at the display panel output.

11. The display device as claimed in 3,
wherein the backlight arrangement comprises a single waveguide,
wherein the single waveguide comprises scattering elements,
wherein the scattering elements are arranged to provide out-coupling of a first light from the waveguide,
wherein the backlight arrangement comprises UV, visible and IR light LEDs, UV, visible and IR light LEDS provide a second light into the waveguide.

12. The display device as claimed in 8,
wherein the backlight arrangement comprises a single waveguide,
wherein the single waveguide comprises scattering elements,
wherein the scattering elements are arranged to provide out-coupling of a first light from the waveguide,
wherein the backlight arrangement comprises UV, visible and IR light LEDs, UV, visible and IR light LEDS provide a second light into the waveguide.

13. The display device as claimed in 10,
wherein the backlight arrangement comprises a single waveguide,
wherein the single waveguide comprises scattering elements,
wherein the scattering elements are arranged to provide out-coupling of a first light from the waveguide,
wherein the backlight arrangement comprises UV, visible and IR light LEDs, UV, visible and IR light LEDS provide a second light into the waveguide.

14. A method of operating a display device having a privacy mode and a public mode, wherein the display device comprises a display panel, a backlight arrangement, wherein the backlight arrangement is arranged to illuminate the display panel and a light blocking arrangement arranged to selectively block the light which is directed in a lateral output direction from the display panel, wherein the light blocking arrangement is formed from a photochromic material, wherein the blocking function of the photochromic material is dependent on a light stimulus of a particular wavelength incident on the light blocking arrangement, the method comprising:
configuring the display in one of the privacy mode and the public mode, wherein the configuring depends on the spectrum of light incident on the light blocking arrangement;
using the backlight arrangement to provide a first, non-visible, light output,
wherein the light output is the light stimulus for inducing switching of the light blocking elements towards an opaque state to implement the privacy mode,
wherein the light blocking arrangement blocks the laterally directed light;
using the backlight arrangement to provide a second visible light output;
removing the light stimulus from the light blocking arrangement; and
using the backlight arrangement to provide a third output for inducing switching of the light blocking elements to a transparent state,
wherein the transparent state implements the public mode,
wherein the light blocking arrangement does not block the laterally directed light
wherein the first, non-visible output is a UV light output and the third output is an IR light output.

15. The method as claimed in claim 14,
wherein the display device further comprises an array of lenses arranged in front of the display panel,
wherein the light blocking arrangement is arranged to selectively block the light, wherein the light is directed between the lenses,
wherein the light blocking arrangement comprises elements disposed between adjacent lens locations,
wherein the light blocking arrangement blocks the light which is directed between the lenses in the privacy mode,
wherein the light blocking arrangement does not block the light which is directed between the lenses in the public mode.

16. The method as claimed in claim 14, wherein the display device comprises a UV filter at the display panel output.

17. The method as claimed in claim 14, wherein the display device comprises an IR filter at the display panel output.

18. The method as claimed in claim 14,
wherein the backlight arrangement comprises a single waveguide,
wherein the single waveguide comprises scattering elements,
wherein the scattering elements are arranged to provide out-coupling of a first light from the waveguide,
wherein the backlight arrangement comprises UV, visible and IR light LEDs, UV, visible and IR light LEDS provide a second light into the waveguide.

19. The method as claimed in claim 14, wherein the light blocking arrangement comprises a photochromic material, the photochromic material comprising a mixture of a solvent, resin or polymer with a photochromic dye.

20. A display device having a privacy mode and a public mode, comprising:
a display panel;
a backlight arrangement, wherein the backlight arrangement is arranged to illuminate the display panel; and
a light blocking arrangement,
wherein the light blocking arrangement is arranged to selectively block light,
wherein the light is directed in a lateral output direction from the display panel,
wherein the display blocks the laterally directed light using the light blocking arrangement in the privacy mode,
wherein the display does not block the laterally directed light in the public mode,
wherein the light blocking arrangement comprises elements formed from a photochromic material,
wherein the blocking function of the photochromic material is dependent on a light stimulus of a particular wavelength incident on the light blocking arrangement,
wherein the backlight arrangement has a first, non-visible, light output which is the light stimulus for inducing switching of the light blocking elements to an opaque state,
wherein the backlight arrangement has a second, visible, light output,
wherein the backlight arrangement has a third output for inducing switching of the light blocking elements to a transparent state
wherein the third output is an IR light output.

* * * * *